United States Patent [19]

Kiribayashi et al.

[11] Patent Number: 5,549,325
[45] Date of Patent: Aug. 27, 1996

[54] ACTIVATING DEVICE IN A PASSENGER PROTECTION APPARATUS

[75] Inventors: Shinichi Kiribayashi, Anjou; Toshikazu Ina, Nagoya, both of Japan

[73] Assignee: Nippondenso Co., Ltd., Kariya, Japan

[21] Appl. No.: 425,462

[22] Filed: Apr. 20, 1995

[30] Foreign Application Priority Data

Apr. 21, 1994 [JP] Japan .................. 6-083042

[51] Int. Cl.⁶ .......................................... B60R 21/32
[52] U.S. Cl. ................. 280/735; 180/274; 307/10.1; 340/436
[58] Field of Search ..................... 280/735, 734, 280/730.2, 730.1; 180/274, 282; 307/10.1; 340/436, 438

[56] References Cited

U.S. PATENT DOCUMENTS

| | | | |
|---|---|---|---|
| 4,287,431 | 9/1981 | Yasui et al. | 280/735 |
| 4,384,734 | 5/1983 | Yasui | 280/735 |
| 4,933,570 | 6/1990 | Swart et al. | 280/735 |
| 5,194,755 | 3/1993 | Rhee et al. | 280/735 |
| 5,307,896 | 5/1994 | Taguchi et al. | 280/735 |
| 5,343,394 | 8/1994 | Takeuchi et al. | 280/735 |
| 5,373,193 | 12/1994 | Nilsson et al. | 280/735 |

FOREIGN PATENT DOCUMENTS

93/17893  9/1993  WIPO .................. 280/735

*Primary Examiner*—Eric D. Culbreth
*Assistant Examiner*—Peter C. English
*Attorney, Agent, or Firm*—Cushman, Darby & Cushman

[57] ABSTRACT

A switch is disposed between a power source and an activating element for activating a passenger protection apparatus. The switch detects a vehicle collision and closes its contacts to supply activating current to the activating element. A capacitor is connected in parallel with the activating element in order to charge momentarily when the switch closes. In this manner, it is possible to activate the activating element accurately because the activating element continues to be supplied with activating current by means of the charging voltage of the capacitor, even when the switch only closes for a time which is insufficient to activate the activating element.

21 Claims, 2 Drawing Sheets

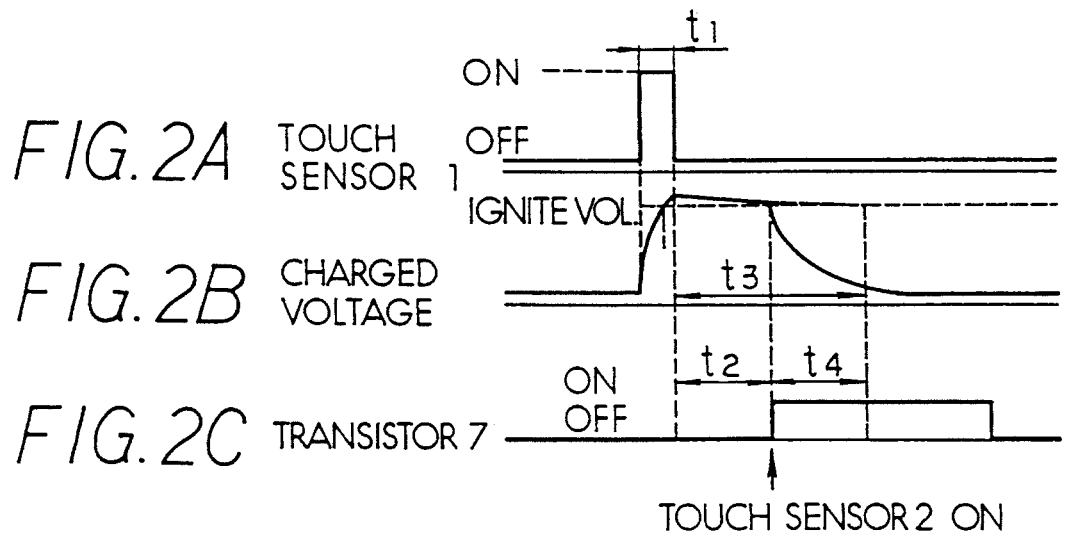
FIG. 2A TOUCH SENSOR 1
FIG. 2B CHARGED VOLTAGE
FIG. 2C TRANSISTOR 7
FIG. 3
PRIOR ART
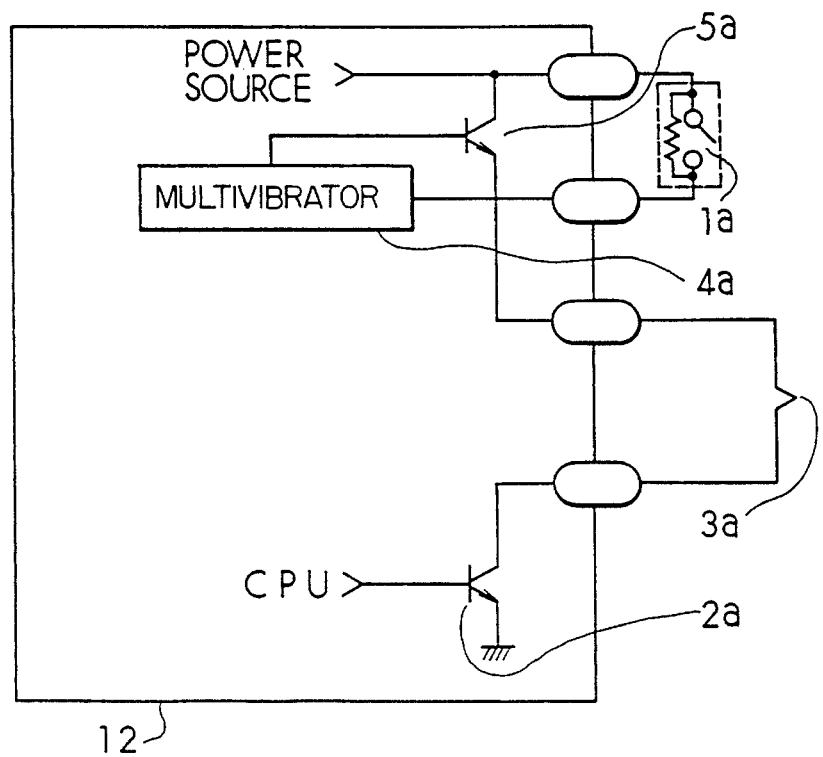

ACTIVATING DEVICE IN A PASSENGER PROTECTION APPARATUS

CROSS REFERENCE TO RELATED APPLICATION

This application is based upon and claims priority from Japanese Patent Application No. Hei 6-83042 filed Apr. 21, 1994, the contents of which are incorporated herein by reference.

BACKGROUND OF THE INVENTION

1. Field of the Invention

The present invention relates to an activating device in a passenger protection apparatus to cause to activate a passenger protection apparatus such as for example an airbag apparatus during a vehicle collision.

2. Related Art

A device as indicated in FIG. 3 has been already devised as an activating device to cause to activate a passenger protection apparatus such as, for example, an airbag apparatus, when a vehicle collision has been occurred.

As shown in FIG. 3, the activating device is structured by means of a sensor 1a for the purpose of detecting the vehicle collision, an ignition drive transistor 2a, an activating element 3a, a multivibrator 4a, and a transistor 5a for applying an activating current to the activating element 3a.

When attempting to detect a side-collision of the vehicle with the sensor 1a, the sensor 1a is disposed in a door portion or the like which is the side portion of the vehicle. Contacts of the sensor 1a close in correspondence to acceleration or load generated during the side-collision of the vehicle. When the contacts of the sensor 1a are closed, the sensor 1a supplies the activating current from a power source (not illustrated) to the activating element 3a. However, in case the sensor 1a is disposed in a door portion for the purpose of detecting the side-collision of the vehicle, the sensor 1a must be installed in a narrow space of a door inner portion of the vehicle. Additionally, supply of the activating current for a specified time is required for the purpose of causing to activate the passenger protection apparatus such as the airbag apparatus. This is because the possibility exists that the passenger protection apparatus may not be activated accurately if the supply of the activating current is not maintained for the specified time. It is necessary to maintain the supply of the activating current for the specified time.

However, a sensor of mechanical type composed of a moving body and spring or the like cannot be employed as the sensor 1a required to be installed in the narrow space such as the door inner portion where is no margin in installation space. This is because the sensor of mechanical type is difficult to form in a compact configuration due to the structure thereof. Additionally, since the sensor of mechanical type must maintain an "on" state and continue to supply the activating current for the specified time, measures must inevitably be taken. An example of the measures is to lengthen the stroke of the moving body of the mechanical type sensor. However, the "on" state for the specified time is assured by means of this measure, while the configuration of the mechanical type sensor inevitably becomes large, and the installation in the narrow space such as the door inner portion of the vehicle is impossible. Moreover, in a case whereby the sensor of mechanical type is installed in the door inner portion, the moving body or spring may operate and the side-collision of the vehicle may be erroneously detected in response to shock when the door of the vehicle is closed.

For these reasons, as the sensor 1a for side-collision detection use, a collision detection sensor of contact type (hereinafter termed a "touch sensor") is employed. The touch sensor, which is disclosed in for example Japanese Patent Publication No. Hei 5-45371 (equivalent to U.S. Pat. No. 5,307,896), can be formed compactly and moreover does not erroneously detect the shock caused by closing the door of the vehicle. The touch sensor can be formed compactly as described above, but because a conductive body makes contact and goes "on" state based on a deformation of the door portion due to the side-collision, it cannot maintain the "on" state, i.e., the supply of the activating current for the specified time. Maintaining the supply of the activating current for the specified time is necessary to accurately cause to activate the passenger protection apparatus. Accordingly, the multivibrator 4a is employed to maintain the supply of the activating current for the specified time.

That is to say, in a case whereby the contacts of the sensor 1a closes in correspondence to the deformation of the door portion of the vehicle, the closure of the contacts is detected by means of the multivibrator 4a. When the multivibrator 4a detects the closure of the contacts, the multivibrator 4a outputs a pulse signal with a predetermined pulse width to a base of the transistor 5a connected to the sensor 1a. The transistor 5a is turned on with the pulse signal and is maintained the "on" state so as to supply the activating current to the activating element 3a for the specified time.

Additionally, in a case whereby the side-collision of the vehicle has been detected by means of an acceleration sensor (not illustrated) installed in an electrical control unit (ECU) 12, the ignition drive transistor 2a receives a driving signal from a central processing unit (CPU) based on a detection signal from the acceleration sensor and supplies the activating current to the activating element 3a.

However, according to the prior art, as is shown in FIG. 3, the multivibrator 4a and the ECU 12 including the CPU are employed in order to maintain the supply of the activating current to the activating element 3a and to activate the activating element 3a. In maintaining the supply of the activating current described above, a strong possibility exists of receiving large adverse effects due to electromagnetic buffering and electrical obstruction. That is to say, in a case where the adverse effects are received, even in a case wherein the sensor 1a has not detected the vehicle collision, there may be cases wherein the multivibrator 4a makes the transistor 5a conductable. Similarly, the possibility exists that the central processing unit (CPU) may make the ignition drive transistor 2a conductable. In cases such as these, the activating element 3a is erroneously activated and the passenger protection apparatus operates erroneously, and so this becomes a cause which reduces the reliability of the passenger protection apparatus.

SUMMARY OF THE INVENTION

Accordingly, it is an object of the present invention to provide an activating device in a passenger protection apparatus of improved reliability by reliably maintaining supply of an activating current for the purpose of causing to activate the passenger protection apparatus.

In order to attain the object, the activating device in the passenger protection apparatus according to the present invention comprises at least one power source mounted on a vehicle, an activating element to activate the passenger protection apparatus in a case whereby an activating current is supplied from the power source, first switching means connected in series with the activating element between the activating element and the power source to be closed upon collision of the vehicle and supply the activating current to the activating element, and a capacitor connected to the first switching means to be charged momentarily in a case of closure of the first switching means, wherein the activating current is conducted from the capacitor to the activating element even after opening of the first switching means.

As described above, by means of providing the capacitor it is possible to supply the activating current from the capacitor to the activating element for a time specified according to the capacitance of the capacitor, even after the first switching means has opened. Thus, the time during which the first switching means is closed can be accomplished by means of the capacitor similarly to extending the specified time. That is to say, even if the time during which the first switching means is closed is insufficient for the purpose of activating the activating element, it is possible to reliably activate the activating element by means of supplying the activating current from the capacitor to the activating element.

It is preferable to further provide second switching means connected between the activating element and a ground to be closed upon the collision of the vehicle. In a case where first and second switching means are provided, the activating current is not supplied to the activating element if both switching means do not close, and so it becomes possible to accurately detect the collision of the vehicle. Accordingly, it becomes possible to prevent erroneous operation of the activating element, and it is possible to reliably protect the passenger.

Furthermore, it is preferable to provide a first resistor having a predetermined resistance value connected in parallel to the first switching means for the purpose of diagnosing the activating device, and a second resistor is connected in parallel to the capacitor, wherein the resistance value of the second resistor is established at a value smaller than the predetermined resistance value of the first resistor. By means of selectively establishing the resistance value of the second resistor which is smaller than the resistance value of the first resistor, it is possible to maintain the electrical potential of the capacitor during the time when the first switching means is open at a potential whereat conductability of the activating element is not reached.

Moreover, in a case whereby collision to a door portion or the like of a vehicle is detected and a passenger is protected from the collision, if the first or second switching means or both are installed in the door inner portion, it is possible to detect the collision reliably. Additionally, in this case, because conductance of the activating current can be maintained as described above, it becomes possible to employ compact switching means as the first and second switching means.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 2A–2C are timing charts illustrating signals in the circuit of FIG. 1; and

FIG. 3 is a simplified circuit diagram indicating an activating device according to the prior art.

DETAILED DESCRIPTION OF THE PREFERRED EMBODIMENTS

Figure 1:
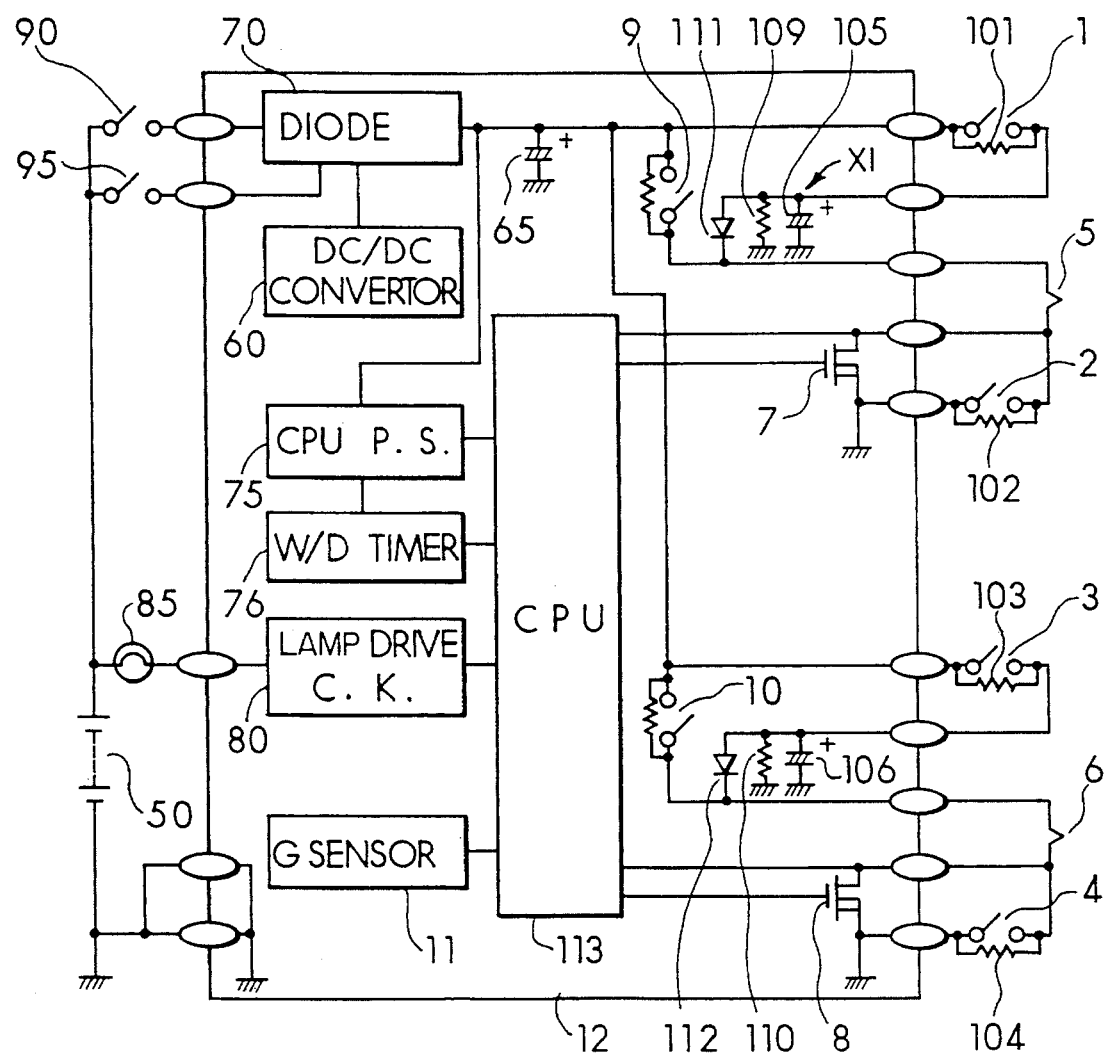
FIG. 1 is a circuit diagram of the embodiment according to the present invention.

An embodiment according to the present invention will be described hereinafter with reference to the drawings.

FIG. 1 is a circuit diagram indicating application of an activating device according to the present invention to an airbag apparatus. Airbags of the airbag apparatus are expanded and developed in order to protect passengers when a side surface of a vehicle has collided with some obstruction.

As shown in FIG. 1, touch sensors 1 and 2 and resistors 101 and 102 for diagnosis use thereof are disposed within a door (not illustrated) on a driver seat side, and touch sensors 3 and 4 and resistors 103 and 104 for diagnosis use thereof are disposed within a door (not illustrated) on a passenger seat side. In specific terms, these are disposed within a gap of several millimeters between a door outer panel and a side door beam within the respective doors. The several touch sensors 1, 2, 3, and 4 detect deformations of the respective door portions due to a side-collision of the vehicle. That is to say, deformations of the door portions due to compression force at the time of the side-collision act upon the several touch sensors 1, 2, 3, and 4, which are closed, i.e., go to an "on" state, so as to supply activating current from a power source 50 to respective activating elements 5 and 6. When the activating current is supplied to the activating element 5, the activating element 5 is ignited and inflates the airbag (not illustrated) so as to protect the passenger on the driver seat side. Similarly, when the activating current is supplied to the activating element 6, the activating element 6 is ignited and inflates the airbag (not illustrated) so as to protect the passenger on the passenger seat side. Additionally, shock to other than a door portion of the vehicle, for example shock to a side portion of the hood or to a side portion of the trunk or the like, is detected by an acceleration (G) sensor 11 and respective safety sensors 9 and 10. Safety sensors 9 and 10 may be mechanical-type sensors for closing upon detecting a predetermined shock in a longitudinal or diagonal direction of the vehicle. The G sensor 11 outputs a detection signal in corresponding to the shock. When a central processing unit (CPU) 113 determines based on the detection signal that the vehicle collision has occurred, the CPU 113 makes transistors 7 and 8 conductive to supply the activating current to the activating elements 5 and 6. Thus, even in a case where the shock to an area such as these has been detected, the activating current is supplied to the activating elements 5 and 6 within the doors to cause the activation of the airbag apparatus. These acceleration sensor 11 and safety sensors 9 and 10 are disposed within an electronic control unit (ECU) 12 installed on an outer portion of the door. Additionally, the safety sensors 9 and 10 are sensors of mechanical type, and are constructed with a spring and a moving body as is well-known. When sudden acceleration is generated by means of the collision, the moving body is shifted to close contacts of the respective safety sensors 9 and 10, and the spring is compressed. The safety sensors 9 and 10 make the activating current suppliable only during closing the contacts thereof e.g., a time maintaining the "on" state of the contacts. Accordingly, in a case whereby maintaining the "on" state for the length of the specified time is attempted, simple solution by means of forming the shifting length of the moving body to be long is possible, but there also exists the problem wherein the formation cannot be made small and compact. For this reason, installation of mechanical type sensors such as these safety sensors 9 and 10 in a door inner portion of the vehicle is extremely difficult. Additionally, the mechanical type sensor reacts to the sudden acceleration generated at the time of the vehicle collision and detects the shock due to the vehicle collision, and so the chance exists of reaction to acceleration generated by means of door opening or closing other than the vehicle collision and erroneous detection as the vehicle collision. Because cases such as this may be presumed, normally it is difficult to employ the mechanical type sensor in the door inner portion or the like.

The respective safety sensors 9 and 10 are connected to the respective touch sensors 1 and 3. For this reason, it is possible to supply the activating current independently to the activating elements 5 and 6 without being influenced by operation of the touch sensors 1 and 3.

Resistors 101, 102, 103, and 104 for diagnosis use are connected in parallel to the respective touch sensors 1, 2, 3, and 4. The respective resistors 101 and 103, together with resistors 109 and 110 which will be described later, perform a safety function for activation of the activating elements 5 and 6.

Capacitors 105 and 106 are connected to the activating elements 5 and 6. The capacities of these capacitors 105 and 106 are established at capacities whereby supply of the activating current required to activate the respective activating elements 5 and 6 is possible.

The CPU 113 disposed within the electronic control unit (ECU) 12 monitors a change in electronic potential at a ground side of the activating elements 5 and 6 in a case whereby the touch sensors 2 and 4 have gone into the "on" state. In a case where the CPU 113 detects the change in the electronic potential, the CPU 113 also makes respective transistors 7 and 8 for ignition drive use conductive and maintains the conductable state for a specified time.

Diodes 111 and 112 are connected in series to the touch sensors 1 and 3. The diodes 111 and 112 prevent the activating current by way of the safety sensors 9 and 10 from reaching to the capacitor 105 and 106.

The electronic control unit (ECU) 12 further includes a DC-DC converter 60 for stepping up the voltage of the power source, and back-up capacitor 65 for storing the boosted voltage. A diode circuit 70 for preventing the current based on the boosted voltage from flowing back to the power source 50. The power supply 75 for the CPU 113 generates a suitable voltage for the CPU 113 from the boosted voltage and supplies the voltage to the CPU 113. Watchdog timer 76 monitors an operation of the CPU 113, and when faulty operation of the CPU 113 is detected, the watchdog timer 76 outputs a reset signal to the CPU 113. The CPU 113 also monitors the an operation of a circuit as shown in FIG. 1, and when an abnormality of the circuit is detected, CPU 113 turns on a lamp 85 by driving a lamp driving circuit 80 and notifies the abnormality to a passenger of the vehicle. Reference numeral 90 indicates an ignition switch of the vehicle and reference numeral 95 indicates an accessory switch.

Operation of the activating device structured in the abovementioned manner will be described hereinafter.

The touch sensors 1 and 2 as well as 3 and 4 are installed within respective doors as described above, but because mode of operation and effects are similar for the driver seat side and the passenger seat side, the detailed description hereinafter will relate only to the driver seat side.

The touch sensors 1 and 2 are provided in order to detect the side-collision to the door portion of the driver seat side. This is because detection of the side-collision by means of two sensors has a stronger possibility than a case of detection of the side-collision by one sensor of being able to avoid erroneous operation of an airbag due to erroneous ignition to the activating element 5 at a time other than the sidecollision. However, it is of course possible to detect the side-collision by means of only one sensor.

In the activating device provided with two sensors according to the present embodiment, if either of the respective touch sensors 1 and 2 does not go into the "on" state at the side-collision to the door portion, the activating current is not supplied to the activating element 5, and protection of the passenger is not accomplished accurately. However, there is no assurance that the two touch sensors 1 and 2 will definitely go into the "on" state simultaneously, and there may exist cases of a subtle discrepancy in timing. In this case, if during the time that one sensor is in the "on" state, the remaining sensor does not go into the "on" state, a state wherein the activating current is not supplied to the activating element 5 is inevitably assumed.

In consideration of this as well, the operation of the activating device will be described hereinafter.

A case whereby the touch sensor 1 goes into the "on" state and the "on" state of the touch sensor 2 has been delayed will be described firstly.

As shown in FIG. 2A, the touch sensor 1 goes into the "on" state by means of the side-collision to the door portion of the vehicle, and the time of the "on" state of the touch sensor 1 is taken to be time t1. The instant that this touch sensor 1 goes into the "on" state, the capacitor 105 is charged by means of the activating current through the touch sensor 1. In this case, when the resistance value of the wiring and resistor 109, and the capacitance of the capacitor 105 or the like are considered, the charged voltage to the capacitor 105 comes to be as indicated in Equation 1 which will be described in detail hereinafter.

Accordingly, if the resistance value of the wiring and resistor 109, and the capacitance of the capacitor 105 or the like (i.e., time constant of the circuit) are determined in consideration of the presumed "on" time of the touch sensor 1, the output voltage of the power supply 50 and ignitable voltage for activating the activating element 5, it is possible to sufficiently activate the activating element 5 by means of the charged voltage to the capacitor 105.

By means of the determination, the voltage more than a ignitable voltage for the purpose of activating the activating element 5 is charged to the capacitor 105 and is maintained for the specified time (t3), even after the "on" state of the touch sensor 1 has ended as shown in FIGS. 2A and 2B. During this maintained time t3, if the remaining touch sensor 2 goes into the "on" state, the transistor 7 for ignition drive use becomes conductive and sufficient activating current can be supplied to the activating element 5. For example, even if the touch sensor 2 goes into the "on" state after the elapse of time t2 after the "on" state of the touch sensor 1 has finished, because time t2 is shorter than time t3, potential sufficient for making possible activation of the activating element 5 is maintained at the capacitor 105. Thus, the maintenance of the ignitable potential described above by means of the capacitor 105 becomes similar to maintaining the "on" time of the touch sensor 1 for the specified time. In this case, the activating current is supplied to the activating element 5 for time t4.

Additionally, a resistor 101 for diagnosis use, having a predetermined resistance value, is connected in parallel to the touch sensor 1 as described above. If the resistance value of this resistor 101 is taken into consideration to establish the resistance value of the resistor 109 connected in parallel to the capacitor 105, the potential of the capacitor 105 when the touch sensor 1 is in an "off" state does not normally reach the ignitable voltage of the activating element 5. For this purpose it is preferable to establish the resistance value of the resistor 109 to be exceedingly small with respect to the resistance value of the resistor 101. By means of establishing the resistance values of the respective resistors 101 and 109 in this manner, it is possible to make the normal charging voltage of the capacitor 105 lower than the ignitable voltage of the activating element 5. Even if hypothetically, the ignition drive transistor 7 becomes conductive by means of some factor, the activating element 5 is not activated at the normal charging voltage at which the capacitor 105 is charged through the resistor 101. The resistors 101 and 109 perform a safety function in preventing a faulty operation of the activating device.

A method to determine the resistance value of the resistor 109 in a case where the resistor 101 has a predetermined resistance R1 will be described with respect to Equation 1, Equation 2, and Equation 3 hereinafter.

$$VT = (VT' - VF) \times e^{(-(t2 \cdot 10^{-3})/(c \cdot (Rsq + Ron)))} \quad \text{[EQUATION 1]}$$

$$VT' = (IG - VF') \times e^{(-(t2 \cdot 10^{-3})/(c \cdot R2))} \quad \text{[EQUATION 2]}$$

$$VN = \{R2/(R1 + R2)\} \times (IG + VF') \quad \text{[EQUATION 3]}$$

Where:
- VT; Voltage required in order to activate activating element 5
- VT'; Outputtable voltage of capacitor 105 after time t2
- VF; Forward-bias voltage of diode 111
- C; Capacitance of capacitor 105
- Rsq; Resistance value of the activating element 5
- Ron; Resistance value of the ignition drive transistor 7
- IG; Voltage of power source 50
- VF'; Drop voltage at diode 111
- VN; Potential at point X1
- R1; Resistance value of resistor 101
- R2; Resistance value of resistor 109

It is possible to calculate the voltage VT required in order to activate the activating element 5 from the foregoing Equations 1 and 2. If a voltage of voltage VT or more is normally supplied to the activating element 5 at other than a time of the vehicle collision, the possibility exists that the activating element 5 may be activated accidentally. Accordingly, the resistance value R2 of the resistor 109 is established with respect to the predetermined resistance value R1 of the resistor 101 so that the potential VN at the point X1 normally becomes a value smaller than the voltage VT. When done in this manner, the charging voltage of the capacitor 105 can be prevented from reaching the ignitable voltage of the activating element 5 by means of current for diagnosis use supplied in minute quantity from the resistor 101 during non-collision.

A case whereby the touch sensor 2 goes into the "on" state and the "on" state of the touch sensor 1 has been delayed will be described next.

Current flows in minute quantity from the power source 50 through the resistor 101 during the non-collision when the touch sensor 1 has not gone into the "on" state. However, if the touch sensor 2 goes into the "on" state, the potential maintained by means of the foregoing minute current changes. This change is detected by the central processing unit (CPU) 113, which makes the ignition drive transistor 7 conductive for the specified time. Since the central processing unit (CPU) 113 makes the ignition drive transistor 7 conductable for the specified time, if the state of the touch sensor 1 changes to the "on" state within the specified time subsequent to the "off" state of the touch sensor 2, the activating current comes to be supplied to the activating element 5.

Effects of the activating device which operates in the foregoing manner will be described hereinafter.

In the airbag apparatus to protect the passengers from the shock due to the collision of some object with the door or like of a vehicle, in order to detect the collision of some object accurately it is necessary to install, in the inner portion of a door portion, a sensor to detect the side-collision. In this case, the place where a sensor can be installed in a door inner portion is extremely small, and the possibility exists that a mechanical type sensor (for example, the above-described safety sensors 9 and 10) cannot be employed. Accordingly, it is necessary to employ touch sensors formed in a contact type to detect the side-collision. The touch sensors include two or more conducting portions which touch and conduct by means of the load generated at the time of the side-collision. In this case, the touching times, i.e., the "on" times, of the touching sensors are extremely short. The time in which the "on" times of the foregoing touch sensor 1 and touch sensor 2 overlap becomes exceedingly short. It is difficult to reliably supply the activating current to the activating element 5 and execute accurate activation. Accordingly, it becomes necessary to maintain the "on" times of the respective touch sensors 1 and 2 for the specified time. In this case, when the maintenance of the "on" times of the touch sensors 1 and 2 was performed with the multivibrator or the central processing unit (CPU) as in the prior art, the possibility existed of erroneous conductance at times other than collision of the vehicle in a case whereby the multivibrator of the CPU was subjected to the influence of magnetic buffering or the like.

However, as described above, by performing maintenance of the conducting time of the touch sensor 1 by means of the capacitor 105, the maintenance of the conducting time of at least the touch sensor 1 becomes immune to the adverse effects of magnetic buffering and the like. Accordingly, even if the transistor 7 which maintains the conducting time of the touch sensor 2 is erroneously made conductive by the central processing unit (CPU) 113, there is no supply of the activating current to the activating element 5 and the protection apparatus does not operate erroneously.

Additionally, by means of connecting the capacitor 105 to the touch sensor 1 as described above, it becomes possible to maintain the activating current to the activating element 5. For this reason, it becomes possible to substitute the touch sensor 1 having the circuit structure in the manner described above for all mechanical type sensors according to the prior art, and it is also possible to greatly reduce the installation area limitations of sensors for collision detection use.

Moreover, it is extremely simple to reduce the configuration of the touch sensor 1, and it is possible to promote compactness of a sensor for collision detection use.

Furthermore, the description has been made regarding a driver seat side of a vehicle, but it is needless to say that a mode of operation and effects similar to the foregoing are demonstrated on a passenger seat side as well.

The present invention is not exclusively the above-described embodiment, but is variously modifiable as will be described hereinafter.

For example, according to the foregoing embodiment, touch sensors 1 and 2 having the above-described circuit structure were employed in order to detect collision to a door portion of a vehicle, but this is not exclusive. For example, employment to detect collision longitudinally with respect to the vehicle or collision diagonally is also acceptable.

In this case, it is possible to maintain, by means of capacitance of a capacitor, a time similar to the sensor "on" time during collision maintained by means of a mechanical type sensor according to the prior art. Accordingly, it is possible to make sensor configuration compact by an amount corresponding to the ability to employ a touch sensor, and there exists the effect wherein installation in a small space also becomes possible.

What is claimed is:

1. An activating device to activate a passenger protection apparatus installed in a vehicle to protect a passenger during vehicle collision, said device comprising:

at least one power source mounted on said vehicle;

an activating element to activate said passenger protection apparatus in a case whereby an activating current is supplied from said power source;

first switching means connected in series to said activating element between said activating element and said power source to be closed upon collision of said vehicle and supply said activating current to said activating element; and a capacitor connected between said first switching means and said power source to be charged momentarily in a case of closure of said first switching means;

wherein said activating current is conducted from said capacitor to said activating element even after opening of said first switching means.

2. An activating device to activate a passenger protection apparatus according to claim 1, further comprising:

a first resistor having a predetermined resistance value and connected in parallel to said first switching means.

3. An activating device to activate a passenger protection apparatus according to claim 1, further comprising:

a second resistor connected in parallel to said capacitor.

4. An activating device to activate a passenger protection apparatus according to claim 1, further comprising:

a first resistor having a predetermined resistance value for the purpose of diagnosing said activating device and connected in parallel to said first switching means; and a second resistor connected in parallel to said capacitor;

wherein a resistance value of said second resistor is established at a value to maintain a charging voltage of said capacitor, which is charged by means of current for diagnosis use supplied from said first resistor when said first switching means is open, at a voltage lower than a voltage enabling activation of said activating element.

5. An activating device to activate a passenger protection apparatus according to claim 1, further comprising:

a first resistor having a predetermined resistance value and connected in parallel to said first switching means; and a second resistor connected in parallel to said capacitor;

wherein a resistance value of said second resistor is established at a value smaller than said predetermined resistance value of said first resistor.

6. An activating device to activate a passenger protection apparatus according to claim 1, wherein said first switching means is disposed within a door portion of said vehicle and is closed by means of side-collision to said door portion.

7. An activating device to activate a passenger protection apparatus according to claim 1, further comprising:

a sensor of mechanical type connected in parallel to said first switching means to detect shock in a longitudinal direction or a diagonal direction of said vehicle and to be closed upon detecting a predetermined shock.

8. An activating device to activate a passenger protection apparatus installed in a vehicle to protect a passenger during vehicle collision, said device comprising:

at least one power source mounted on said vehicle;

an activating element to activate said passenger protection apparatus in a case whereby an activating current is supplied from said power source;

first switching means connected in series to said activating element between said activating element and said power source to be closed upon collision of said vehicle;

second switching means connected between said activating element and a ground to be closed upon collision of said vehicle; and a capacitor connected between said first switching means and said Dower source to be charged momentarily in a case of closure of said first switching means;

wherein said activating current is conducted from said power source or said capacitor to said activating element, in a case whereby said second switching means is closed within a predetermined time after an opening of said first switching means.

9. An activating device to activate a passenger protection apparatus according to claim 8, further comprising:

a first resistor having a predetermined resistance value and connected in parallel to said first switching means.

10. An activating device to activate a passenger protection apparatus according to claim 8, further comprising:

a second resistor connected in parallel to said capacitor.

11. An activating device to activate a passenger protection apparatus according to claim 8, further comprising:

a first resistor having a predetermined resistance value for the purpose of diagnosing said activating device and connected in parallel to said first switching means; and a second resistor connected in parallel to said capacitor;

wherein a resistance value of said second resistor is established at a value to maintain a charging voltage of said capacitor, which is charged by means of current for diagnosis use supplied from said first resistor when said first switching means is open, at a voltage lower than a voltage enabling activation of said activating element.

12. An activating device to activate a passenger protection apparatus according to claim 8, further comprising:

a first resistor having a predetermined resistance value and connected in parallel to said first switching means; and a second resistor connected in parallel to said capacitor;

wherein a resistance value of said second resistor is established at a value smaller than said predetermined resistance value of said first resistor.

13. An activating device to activate a passenger protection apparatus according to claim 8, wherein said first switching means is disposed within a door portion of said vehicle and is closed by means of side-collision to said door portion.

14. An activating device to activate a passenger protection apparatus according to claim 8, further comprising:

a sensor of mechanical type connected in parallel to said first switching means to detect shock in a longitudinal direction or a diagonal direction of said vehicle and to be closed upon detecting a predetermined shock.

15. An activating device to activate a passenger protection apparatus installed in a vehicle to protect a passenger during vehicle collision, comprising:

at least one power source mounted on said vehicle;

an activating element to activate said passenger protection apparatus in a case whereby an activating current is supplied from said power source;

first switching means connected in series with said activating element to be closed upon collision of said vehicle and supply said activating current to said activating element;

a first resistor connected in parallel to said first switching means;

a capacitor connected between said activating element and said power source to be charged momentarily in a case of closure of said first switching means;

second switching means connected between said activating element and a ground to be closed upon collision of said vehicle;

detection means to detect change in electrical potential between said activating element and said second switching means; and a transistor connected in parallel to said second switching means to enable conductance of said activating current in response to a signal from said detection means.

16. An activating device to activate a passenger protection apparatus according to claim 15, further comprising:

a second resistor connected in parallel to said capacitor;

wherein a resistance value of said second resistor is established to be smaller in comparison with a resistance value of said first resistor.

17. An activating device to activate a passenger protection apparatus according to claim 15, further comprising:

a third resistor for diagnosis use connected in parallel to said second switching means.

18. An activating device to activate a passenger protection apparatus according to claim 15, wherein said first switching means is disposed within a door portion of said vehicle and is closed by means of side-collision to said door portion.

19. An activating device to activate a passenger protection apparatus according to claim 15, wherein at least one of said first switching means and said second switching means is installed within a door portion of said vehicle and is closed by means of side-collision to said door portion.

20. An activating device to activate a passenger protection apparatus according to claim 15, wherein said detection means has acceleration detection means to detect acceleration generated during vehicle collision to make said transistor conductive in correspondence to both a case whereby electrical potential between said activating element and said second switching means has changed and a case whereby a predetermined acceleration has been detected by means of said acceleration detection means.

21. An activating device to activate a passenger protection apparatus according to claim 15, further comprising:

a sensor of mechanical type connected in parallel to said first switching means to detect shock in a longitudinal direction or a diagonal direction of said vehicle and to be closed upon detecting a predetermined shock.

* * * * *